(12) United States Patent
Jung et al.

(10) Patent No.: US 12,100,808 B2
(45) Date of Patent: Sep. 24, 2024

(54) COMPOUND, AND LITHIUM SECONDARY BATTERY ELECTROLYTE AND LITHIUM SECONDARY BATTERY WHICH COMPRISE SAME

(71) Applicant: DONGWOO FINE-CHEM CO., LTD., Jeollabuk-do (KR)

(72) Inventors: Kyoung Moon Jung, Jeollanam-do (KR); Sang Jin Lee, Gyeonggi-do (KR); Seong Chul Lee, Gyeonggi-do (KR)

(73) Assignee: DONGWOO FINE-CHEM CO., LTD., Jeollabuk-Do (KR)

(*) Notice: Subject to any disclaimer, the term of this patent is extended or adjusted under 35 U.S.C. 154(b) by 494 days.

(21) Appl. No.: 17/441,591

(22) PCT Filed: Nov. 29, 2019

(86) PCT No.: PCT/KR2019/016725
§ 371 (c)(1),
(2) Date: Sep. 21, 2021

(87) PCT Pub. No.: WO2020/197035
PCT Pub. Date: Oct. 1, 2020

(65) Prior Publication Data
US 2022/0158238 A1    May 19, 2022

(30) Foreign Application Priority Data

Mar. 28, 2019  (KR) .................. 10-2019-0036233
Sep. 6, 2019    (KR) .................. 10-2019-0110984

(51) Int. Cl.
*H01M 10/0567* (2010.01)
*C01D 15/00* (2006.01)
*H01M 10/0525* (2010.01)

(52) U.S. Cl.
CPC ........ *H01M 10/0567* (2013.01); *C01D 15/00* (2013.01); *H01M 10/0525* (2013.01); *C01P 2006/40* (2013.01); *H01M 2300/0025* (2013.01)

(58) Field of Classification Search
CPC ........ H01M 10/0567; H01M 10/0525; H01M 2300/0025; H01M 10/052; C01D 15/00; C01P 2006/40; C07F 5/04; C07F 9/657145; C07F 9/65748; C07F 9/6578; C07F 9/6596; Y02E 60/10
See application file for complete search history.

(56) References Cited

U.S. PATENT DOCUMENTS

| | | | | |
|---|---|---|---|---|
| 2010/0119952 A1* | 5/2010 | Lee | .......... | H01M 4/13 429/324 |
| 2017/0204124 A1* | 7/2017 | Takahashi | ................ | C07F 9/26 |
| 2021/0399340 A1* | 12/2021 | Kuwajima | ............ | C07C 233/13 |
| 2021/0399344 A1* | 12/2021 | Hidaka | ................ | C07D 233/58 |
| 2022/0149433 A1* | 5/2022 | Hidaka | ............... | H01M 10/052 |
| 2023/0145113 A1* | 5/2023 | Hidaka | ............. | H01M 10/0567 429/188 |
| 2024/0014443 A1* | 1/2024 | Kim | ..................... | C07D 327/04 |

FOREIGN PATENT DOCUMENTS

| | | |
|---|---|---|
| CN | 106471000 A | 3/2017 |
| CN | 108615942 A | 10/2018 |
| EP | 3 333 962 A1 | 6/2018 |
| JP | 2014-194870 A | 10/2014 |
| JP | 2016-184463 A | 10/2016 |
| JP | 2016-186910 A | 10/2016 |
| JP | 2017-69146 A | 4/2017 |
| KR | 10-2013-0003649 A | 1/2013 |
| KR | 10-2016-0002314 A | 1/2016 |
| KR | 10-2017-0021335 A | 2/2017 |
| KR | 10-2018-0036340 A | 4/2018 |
| WO | WO 2019/146705 A1 | 8/2019 |

OTHER PUBLICATIONS

International Search Report for PCT/KR2019/016725 mailed on Mar. 20, 2020.
European Search Report For EP19921749.8 issued on Oct. 25, 2022 from European patent office in a counterpart European patent application.
Notice of Grant of Patent right for Invention issued on Apr. 26, 2024 from China Patent Office in a counterpart China Patent Application No. 201980094656.5 (all the cited references are listed in this IDS.) (English translation is also submitted herewith.).

* cited by examiner

*Primary Examiner* — Abdullah A Riyami
*Assistant Examiner* — Nader J Alhawamdeh
(74) *Attorney, Agent, or Firm* — The PL Law Group, PLLC

(57) ABSTRACT

A compound according to an embodiment of the present disclosure is represented by Formula 1. An electrolyte for a lithium secondary battery according to an embodiment of the present disclosure may include the compound, and a lithium secondary battery according to an embodiment of the present disclosure may include the electrolyte.

8 Claims, No Drawings

COMPOUND, AND LITHIUM SECONDARY BATTERY ELECTROLYTE AND LITHIUM SECONDARY BATTERY WHICH COMPRISE SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2019/016725, filed Nov. 29, 2019, which claims priority benefit of Korean Patent Application No. 10-2019-0036233 filed on Mar. 28, 2019 and Korean Patent Application No. 10-2019-0110984 filed on Sep. 6, 2019, the entireties of which are incorporated by reference herein.

BACKGROUND

1. Technical Field

The present invention relates to a novel compound, an electrolyte for a lithium secondary battery including the compound, and a lithium secondary battery including the electrolyte.

2. Background Art

As miniaturization and weight reduction of electronic equipment are realized and the use of portable electronic devices is generalized, researches on secondary batteries having a high energy density as a power source thereof have been actively conducted.

Examples of the secondary battery may include a nickel-cadmium battery, a nickel-metal hydride battery, a nickel-hydrogen battery, and a lithium secondary battery. Among them, research on the lithium secondary battery having a high energy density per unit weight and capable of rapidly charging has been on the rise.

In general, the lithium secondary battery is manufactured by using materials capable of intercalating and deintercalating lithium ions as a cathode and an anode, and filling a space between the cathode and anode with a non-aqueous electrolyte. Due to an oxidation reaction and a reduction reaction when the lithium ions are intercalated and deintercalated from the cathode and anode, electrical energy is generated.

Meanwhile, in order to improve a capacity of the lithium secondary battery, an internal resistance should be low. However, in terms of safety of the battery, the higher the internal resistance, the more advantageous. The capacity and safety of the lithium secondary battery are closely related to properties of the non-aqueous electrolyte composed of a combination of a solute such as an electrolyte salt and a non-aqueous organic solvent.

Korean Patent Laid-Open Publication No. 2018-0036340 relates to an electrolyte for a lithium secondary battery and a lithium secondary battery including the same, and discloses the contents about an electrolyte for a lithium secondary battery including: a non-aqueous organic solvent; a lithium salt; and an additive including a compound represented by Formula 1.

Korean Patent Laid-Open Publication No. 2013-0003649 relates to an electrolyte solution additive for a lithium secondary battery, and a non-aqueous electrolyte solution and a lithium secondary battery including the same, and discloses the contents about a non-aqueous electrolyte solution additive for a lithium secondary battery including a bidentate alkoxyphosphine compound represented by Formula 1.

However, it is difficult to handle the conventional compounds for a lithium secondary battery electrolyte because a low-molecular substance is vaporized during synthesis, which results in a decrease in yield and an increase in costs. In addition to these problems, there are problems that oxidation stability is deteriorated, such that reliability in the battery is reduced, and an output of the battery is decreased.

Meanwhile, Korean Patent Laid-Open Publication No. 2018-0038038 relates to a non-aqueous electrolyte solution and a non-aqueous electrolyte battery using the same, and specifically discloses the contents about a non-aqueous electrolyte solution including a non-aqueous solvent and an electrolyte dissolved in the non-aqueous solvent, the non-aqueous electrolyte solution includes: (I) a difluoro ionic complex (1-Cis) represented by a general formula (1-Cis); and (II) at least one compound selected from the group consisting of cyclic sulfonic acid ester, cyclic sulfonic acid ester having an unsaturated bond, cyclic sulfuric acid ester, cyclic disulfonic acid ester, chain disulfonic acid ester, cyclic disulfonic acid anhydride, nitrile group-containing compound, silyl phosphate ester derivative, and silyl borate ester derivative.

However, in the case of the prior art documents, there is a limitation in solubility of the Li salt, and the lowest unoccupied molecular orbital (LUMO) level is somewhat low, which results in a problem that entails a side reaction in which the Li salt is decomposed at the anode. Further, since the electrolyte solution uses an organic ligand, some problems, in which $CO_2$ gas is generated, occur.

Therefore, development of an electrolyte for a lithium secondary battery that allows the battery to exhibit high output characteristics is required.

SUMMARY

An object of the present invention is to provide a novel compound which allows a battery to exhibit high output characteristics, and allows the battery to demonstrate sufficient performance even after being stored at a high temperature, as well as may suppress an increase in a thickness of the battery by suppressing the generation of volatile substances, when the compound is applied to an electrolyte for a lithium secondary battery, and an electrolyte for a lithium secondary battery including the same.

In addition, another object of the present invention is to provide a lithium secondary battery including the electrolyte, which has high output characteristics, exhibits large charge and discharge capacities even at a high C-rate at room temperature, and may demonstrate sufficient performance even after being stored at a high temperature.

To achieve the above objects, according to an aspect of the present invention, there is provided a compound represented by Formula 1 below:

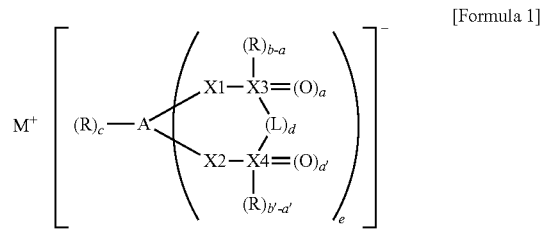

[Formula 1]

Compound

An aspect of the present invention relates to a compound represented by Formula 1 below:

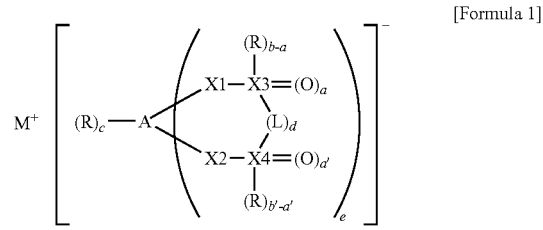

[Formula 1]

in Formula 1,

X1 and X2 are each independently —O—, —S— or —NR'—,

R' is a linear, branched or cyclic C1 to C10 hydrocarbon group which may contain a hetero atom or halogen atom, X3 and X4 are each independently carbon, phosphorus or sulfur, however, at least one of X3 and X4 is phosphorus or sulfur, A is boron or phosphorus, R is each independently hydrogen; a halogen atom; a linear, branched or cyclic C1 to C10 hydrocarbon group which may contain a halogen atom; OR'; or OSiR'$_3$;

L is a C1 hydrocarbon group unsubstituted or substituted by a halogen atom; or oxygen;

M is lithium, sodium, potassium or ammonium (NR"$_4$),

R" is each independently hydrogen; or a linear, branched or cyclic C1 to C10 hydrocarbon group which may contain a hetero atom or halogen atom, a and a' are each independently an integer of 0 to 2, b and b' are each independently an integer of 0 to 2, c is an integer of 0 to 4, d is an integer of 0 to 3, e is an integer of 1 to 3, and however, b-a and b'-a' are an integer of 0 or more.

As used herein, the "hetero atom" refers to O, N, or S as a heterogeneous element.

As used herein, the "halogen atom" refers to F, Cl, Br or I.

As used herein, the "hydrocarbon group" may refer to a linear or branched aliphatic hydrocarbon group and a cyclic aliphatic hydrocarbon group.

The linear or branched aliphatic hydrocarbon group may include a linear aliphatic hydrocarbon group such as a methyl group, ethyl group, propyl group, butyl group, pentyl group, hexyl group, heptyl group, and octyl group, etc.; a branched aliphatic hydrocarbon group such as an isopropyl group, isobutyl group, isopentyl group, neopentyl group, and 2-ethylhexyl group etc. The number of carbon atoms of the aliphatic hydrocarbon group is 1 to 6, preferably 1 to 5, and more preferably 1 to 4.

The ring-shaped (cyclic) aliphatic hydrocarbon group may be monocyclic or polycyclic. The cyclic aliphatic hydrocarbon group may include a cyclopropyl group, cyclobutyl group, cyclopentyl group, and cyclohexyl group, etc. The number of carbon atoms of the cyclic aliphatic hydrocarbon group is 3 to 8, and preferably 3 to 6.

The compound according to the present invention has an advantage of excellent solubility.

When an inorganic ligand-containing lithium salt compound having a high polarity, which is represented by Formula 1 according to the present invention, is used as an additive of an electrolyte for a lithium secondary battery,

--- in Formula 1,

X1 and X2 are each independently —O—, —S— or —NR'—,

R' is a linear, branched or cyclic C1 to C10 hydrocarbon group which may contain a hetero atom or halogen atom, X3 and X4 are each independently carbon, phosphorus or sulfur, however, at least one of X3 and X4 is phosphorus or sulfur, A is boron or phosphorus, R is each independently hydrogen; a halogen atom; a linear, branched or cyclic C1 to C10 hydrocarbon group which may contain a halogen atom; OR'; or OSiR'$_3$;

L is a C1 hydrocarbon group unsubstituted or substituted by a halogen atom; or oxygen;

M is lithium, sodium, potassium or ammonium (NR"$_4$),

R" is each independently hydrogen; or a linear, branched or cyclic C1 to C10 hydrocarbon group which may contain a hetero atom or halogen atom, a and a' are each independently an integer of 0 to 2, b and b' are each independently an integer of 0 to 2, c is an integer of 0 to 4, d is an integer of 0 to 3, e is an integer of 1 to 3, and however, b-a and b'-a' are an integer of 0 or more.

In addition, the present invention provides an electrolyte for a lithium secondary battery including the above-described compound.

Further, the present invention provides a lithium secondary battery including the above-described electrolyte for a lithium secondary battery.

According to the present invention, there are advantages as follows. The compound according to the present invention has excellent solubility, and may impart excellent reliability when applied to an electrolyte for a lithium secondary battery.

In addition, the electrolyte for a lithium secondary battery according to the present invention enables the battery to exhibit high output characteristics, and demonstrate sufficient performance even after being stored at a high temperature, as well as it is possible to suppress an increase in a thickness of the battery by suppressing a generation of volatile substances.

Further, the lithium secondary battery including the electrolyte for a lithium secondary battery according to the present invention has high output characteristics, and exhibits large charge and discharge capacities even at a high C-rate at room temperature, as well as it is possible to demonstrate sufficient performance even after being stored at a high temperature, and suppress an increase in the thickness of the battery.

DETAILED DESCRIPTION

Hereinafter, the present invention will be described in more detail.

In the present invention, when the explanatory phrase a member is located "on" another member is used, this includes not only a case where a member is in direct contact with another member but also a case where another member is interposed between two members.

In the present invention, when the explanatory phrase a part "includes" a component is used, this means that the part may further include the component without excluding other components, so long as special explanation is not given.

there are advantages in that the compound may be easily adsorbed to an electrode surface by oxidation reaction to form a stable film, thereby imparting low resistance and high output, and decreasing a problem entailed in volatilization of organic material. Due to this, there is an advantage in that the battery including the same may exhibit excellent life-span characteristics at room temperature and high temperature stability.

In an embodiment of the present invention, the compound represented by Formula 1 may be further defined as follows:

in Formula 1, when X3 or X4 is carbon, a may be 0 or 1, a' may be 0 or 1, b may be 1 or 2, and b' may be 1 or 2, when X3 or X4 is phosphorus, a may be 0 or 1, a' may be 0 or 1, b may be 1 or 2, and b' may be 1 or 2, when X3 or X4 is sulfur, a may be an integer of 0 to 2, a' may be an integer of 0 to 2, b may be an integer of 0 to 2, and b' may be an integer of 0 to 2, when A is boron, c may be 0 or 2, when A is phosphorous, c may be 0, 2 or 4;

when L is carbon, d may be an integer of 0 to 3, and when L is oxygen, d may be 0 or 1.

For example, the compound represented by Formula 1 may be represented by a combination of X3 or X4, and A and L.

In another embodiment of the present invention, the compound represented by Formula 1 may be represented by any one of Formulae 2 to 13 below.

[Formula 2]

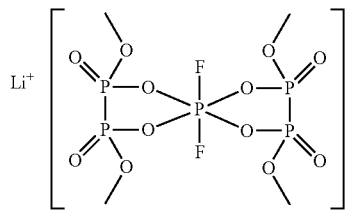

[Formula 3]

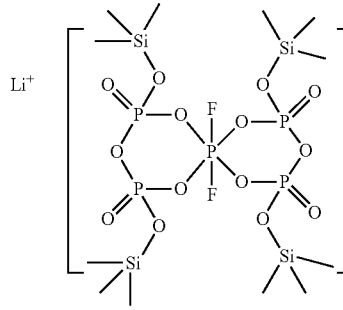

[Formula 4]

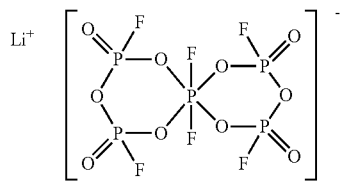

-continued

[Formula 5]

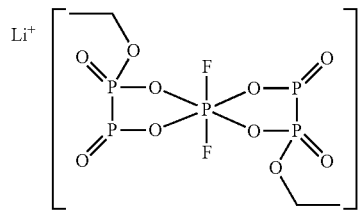

[Formula 6]

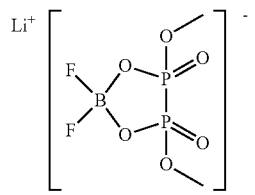

[Formula 7]

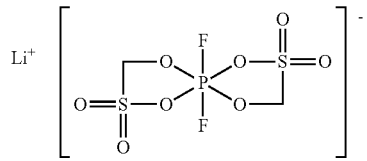

[Formula 8]

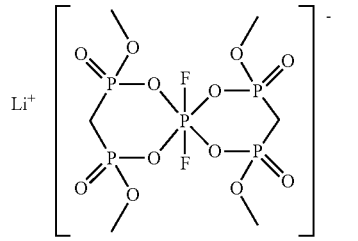

[Formula 9]

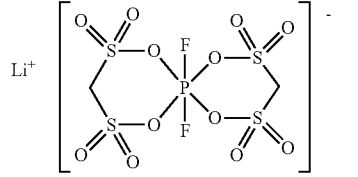

[Formula 10]

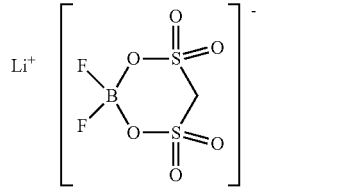

[Formula 11]

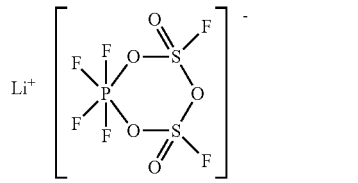

-continued

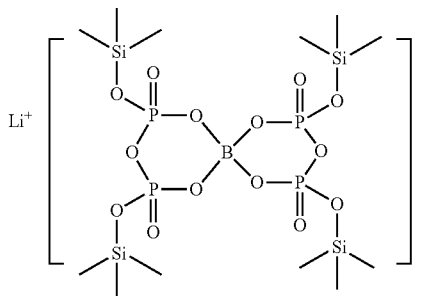

[Formula 12]

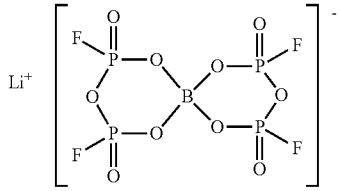

[Formula 13]

When the compound according to the present invention is any one of the compounds represented by Formulae 2 to 13, it may have more excellent solubility, thus being preferable.

In particular, when any one of the compounds represented by Formulae 2 to 13 is used as the electrolyte for a lithium secondary battery, there is an advantage in that a generation of volatile gases is suppressed while improving an output of the battery.

The compound represented by Formula 1 may be synthesized by, for example, dissolving $LiPF_6$ or $LiBF_4$ in a carbonate solvent, and then slowly adding a ligand into which trimethylsilyl is introduced as much as necessary equivalent, followed by performing a reaction for 12 hours to 24 hours by increasing the temperature to 40 to 80° C.

Since the compound according to the present invention is an inorganic ligand, when applying as an electrolyte for a lithium secondary battery, there is an advantage in that it is possible to maximize the output of the battery while suppressing a generation of $CO_2$ gas in the oxidation process of the existing organic ligand.

Electrolyte for Lithium Secondary Battery

Another aspect of the present invention relates to an electrolyte for a lithium secondary battery including the above-described compound.

Specifically, another aspect of the present invention relates to an electrolyte for a lithium secondary battery including a compound represented by Formula 1 below:

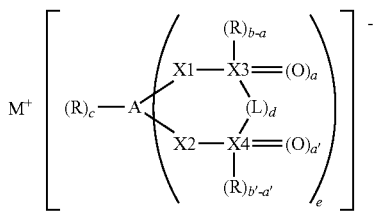

[Formula 1]

in Formula 1,

X1 and X2 are each independently —O—, —S— or —NR'—,

R' is a linear, branched or cyclic C1 to C10 hydrocarbon group which may contain a hetero atom or halogen atom, X3 and X4 are each independently carbon, phosphorus or sulfur, however, at least one of X3 and X4 is phosphorus or sulfur, A is boron or phosphorus, R is each independently hydrogen; a halogen atom; a linear, branched or cyclic C1 to C10 hydrocarbon group which may contain a halogen atom; OR'; or $OSiR'_3$;

L is a C1 hydrocarbon group unsubstituted or substituted by a halogen atom; or oxygen;

M is lithium, sodium, potassium or ammonium ($NR''_4$),

R" is each independently hydrogen; or a linear, branched or cyclic C1 to C10 hydrocarbon group which may contain a hetero atom or halogen atom, a and a' are each independently an integer of 0 to 2, b and b' are each independently an integer of 0 to 2, c is an integer of 0 to 4, d is an integer of 0 to 3, e is an integer of 1 to 3, and however, b-a and b'-a' are an integer of 0 or more.

Since the electrolyte for a lithium secondary battery according to the present invention includes the above-described compound, there are advantages in that the compound may be easily adsorbed to an electrode surface by oxidation reaction to form a stable film, thereby imparting low resistance and high output, and decreasing the problem entailed in volatilization of organic material.

In another embodiment of the present invention, the compound may be included in an amount of 0.01 to 10 parts by weight based on 100 parts by weight of a whole electrolyte for a lithium secondary battery.

In another embodiment of the present invention, the compound may be included in an amount of 0.1 to 5.0 parts by weight, and specifically 0.2 to 5 parts by weight based on 100 parts by weight of the whole electrolyte for a lithium secondary battery.

When the compound is included within the above range, the effects of low resistance and high output are maximized, thus being preferable.

In another embodiment of the present invention, the electrolyte for a lithium secondary battery may further include at least one selected from the group consisting of a lithium salt; and an organic solvent.

The lithium salt serves as a source of lithium ions in the battery to enable a basic operation of the lithium battery. A concentration of the lithium salt may be 0.5 to 1.5M, but it is not limited thereto. However, when the concentration of the lithium salt is within the above range, an electrical conductivity of the electrolyte may be reduced to suppress a phenomenon in which performance of the electrolyte is deteriorated, and a viscosity of the electrolyte may be increased to suppress a phenomenon in which mobility of the lithium ions is decreased. In brief, when the concentration of the lithium salt is within the above range, there are advantages in that the electrolyte has excellent electrical conductivity, and excellent performance, as well as the viscosity of the electrolyte is suitable to secure excellent mobility of lithium ions. However, the concentration of the lithium salt is not limited within the above range, and it is possible to use by appropriately adding or subtracting the concentration.

The lithium salt, for example, may use one selected from the group consisting of $LiPF_6$, $LiBF_4$, $LiSbF_6$, $LiAsF_6$, $LiClO_4$, $LiCF_3SO_3$, $LiN(SO_2F)_2$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlO_4$, $LiAlCl_4$, LiCl and LiI, or a mixture of two or more thereof, but it is not limited thereto. However, in this case, the mobility of the lithium ions is very excellent and the electrical conductivity is excellent, such that the electrolyte has excellent performance.

The organic solvent may include at least one solvent selected from the group consisting of a high-dielectric constant solvent and a low-boiling point solvent.

Specifically, the high-dielectric constant solvent is not particularly limited so long as it is commonly used in the art, and for example, cyclic carbonates such as fluorinated ethylene carbonate, ethylene carbonate, propylene carbonate, butylene carbonate, 1-fluorinated ethylene carbonate, γ-butyrolactone and/or a mixture thereof, and the like may be used.

The low-boiling point solvent may use, for example, chain carbonates such as dimethyl carbonate, ethylmethyl carbonate, diethyl carbonate, dipropyl carbonate, etc., dimethoxyethane, diethoxyethane, fatty acid ester derivatives, and/or a mixture thereof, but it is not limited thereto.

The organic solvent may be included as the balance so as to satisfy 100 parts by weight of the whole electrolyte for a lithium secondary battery. In this case, the above-described lithium salt and compound have excellent desired effects, thus being preferable.

The electrolyte for a lithium secondary battery according to the present invention may further include other additives. Specifically, the electrolyte for a lithium secondary battery according to the present invention may further include additives other than the compound represented by Formula 1.

In brief, the compound represented by Formula 1 according to the present invention may be used as an additive for forming a film on a cathode of the electrolyte for a lithium secondary battery.

The other additives may be, for example, at least one selected from the group consisting of fluorocarbonate, vinylene carbonate, oxalyl tetrafluorophosphate lithium salt, bis(oxalyl)difluorophosphate lithium salt, trisoxalyl phosphate lithium salt and $LiPO_2F_2$.

When the other additives are further included, there is an advantage in that the effects of the compound represented by Formula 1 are further maximized.

The other additives may be included in an amount of 0.5 to 10 parts by weight, and specifically 1 to 3 parts by weight based on 100 parts by weight of the whole electrolyte additive for a lithium secondary battery. In this case, reliability such as life-span characteristics at room temperature and high temperature stability of the lithium secondary battery are increased, thus being preferable.

The electrolyte for a lithium secondary battery according to the present invention may specifically be a non-aqueous electrolyte, and the compound of the present invention may specifically be used as an additive for a non-aqueous electrolyte.

Specifically, the electrolyte for a lithium secondary battery according to the present invention enables the battery to exhibit high output characteristics, have large charge and discharge capacities even at a high rate (high C-rate) at room temperature, and demonstrate sufficient performance even after being stored at a high temperature, as well as it is possible to suppress an increase in the thickness of the battery by suppressing a generation of volatile substances.

Lithium Secondary Battery

Another aspect of the present invention relates to a lithium secondary battery including the above-described electrolyte for a lithium secondary battery.

The electrolyte for a lithium secondary battery according to the present invention is manufactured as a lithium secondary battery by injecting it into an electrode structure including a cathode, an anode, and a separator interposed between the cathode and the anode. The cathode, the anode, and the separator forming the electrode structure may use all substances so long as they are commonly used in the manufacture of the lithium secondary battery.

The cathode and the anode are prepared by applying a cathode active material slurry and an anode active material slurry to respective electrode current collectors.

As the cathode active material, a cathode active material capable of intercalating and deintercalating lithium ions known in the art may be used without particular limitation thereof, and for example, at least one selected from cobalt, manganese, nickel, and one or more of lithium composite oxides is preferably used. As a representative example thereof, lithium-containing compounds described below are preferably used.

$$Li_xMn_{1-y}M_yA_2 \tag{1}$$

$$Li_xMn_{1-y}M_yO_{2-z}X_z \tag{2}$$

$$Li_xMn_2O_{4-z}X_z \tag{3}$$

$$Li_xMn_{2-y}M_yM'_zA_4 \tag{4}$$

$$Li_xCo_{1-y}M_yA_2 \tag{5}$$

$$Li_xCo_{1-y}M_yO_{2-z}X_z \tag{6}$$

$$Li_xNi_{1-y}M_yA_2 \tag{7}$$

$$Li_xNi_{1-y}M_yO_{2-z}X_z \tag{8}$$

$$Li_xNi_{1-y}Co_yO_{2-z}X_z \tag{9}$$

$$Li_xNi_{1-y-z}Co_yM_zA_\alpha \tag{10}$$

$$Li_xNi_{1-y-z}Co_yM_zO_{2-\alpha}X_\alpha \tag{11}$$

$$Li_xNi_{1-y-z}Mn_yM_zA_\alpha \tag{12}$$

$$Li_xNi_{1-y-z}Mn_yM_zO_{2-\alpha}X_\alpha \tag{13}$$

In formulae, x, y, z and α may be in a range of $0.9 \leq x \leq 1.1$, $0 \leq y \leq 0.5$, $0 \leq z \leq 0.5$, and $0 \leq \alpha \leq 2$, respectively, M and M' are the same as or different from each other, and may be selected from the group consisting of Mg, Al, Co, K, Na, Ca, Si, Ti, Sn, V, Ge, Ga, B, As, Zr, Mn, Cr, Fe, Sr, V, and rare earth elements, A is selected from the group consisting of O, F, S and P, and X is selected from the group consisting of F, S and P.

As the anode active material, an anode active material capable of intercalating and deintercalating lithium ions known in the art may be used without particular limitation thereof, and as this anode active material, a carbon-based material such as crystalline carbon, amorphous carbon, carbon composite, carbon fiber, etc., lithium metal, and a lithium alloy, etc. may be used. For example, the amorphous carbon may include hard carbon, cokes, mesocarbon microbead (MCMB) calcined at 1500° C. or lower, mesophase pitch-based carbon fiber (MPCF) and the like. The crystalline carbon may include graphite-based carbon, and specifically natural graphite, graphite cokes, graphite MCMB, graphite MPCF and the like.

The carbon-based material is preferably a material having a d002 interplanar distance of 3.35 to 3.38 Å, and a crystallite size (Lc) of 20 nm or more measured by X-ray diffraction. As the lithium alloy, an alloy of lithium and aluminum, zinc, bismuth, cadmium, antimony, silicon, lead, tin, gallium, or indium may be used.

The cathode active material and the anode active material may be mixed with a binder and a solvent to prepare a cathode active material slurry and an anode active material slurry, respectively.

The binder is a material that plays a role of formation of the active material into paste, mutual adhesion of the active materials, adhesion with the current collector, and a buffer effect against expansion and contraction of the active material, and may include, for example, polyvinylidene fluoride, a polyhexafluoropropylene-polyvinylidene fluoride copolymer (P(VdF/HFP)), poly(vinyl acetate), polyvinyl alcohol, polyethylene oxide, polyvinylpyrrolidone, alkylated polyethylene oxide, polyvinyl ether, poly(methyl) methacrylate), poly(ethyl acrylate), polytetrafluoroethylene, polyvinyl chloride, polyacrylonitrile, polyvinylpyridine, styrene-butadiene rubber, acrylonitrile-butadiene rubber and the like. A content of the binder is 0.1 to 30 parts by weight, and preferably 1 to 10 parts by weight based on 100 parts by weight of a whole electrode active material. If the content of the binder is too small, an adhesive force between the electrode active material and the current collector is insufficient. If the content of the binder is too large, the adhesive force is improved, but the content of the electrode active material is reduced as much as the increased content, thereby it is disadvantageous in terms of implementing a battery having a high capacity.

As a solvent for the active material slurry, a non-aqueous solvent or an aqueous solvent may be commonly used. As the non-aqueous solvent, for example, N-methyl-2-pyrrolidone (NMP), dimethylformamide, dimethylacetamide, N,N-dimethylaminopropylamine, ethylene oxide, tetrahydrofuran, etc. may be used, and as the aqueous solvent, water, isopropyl alcohol, etc. may be used, but it is not limited thereto.

The electrode active material slurry may further include a conductive material, a thickener, and the like, as necessary.

The conductive material is a material for improving electronic conductivity, and may use at least one selected from the group consisting of a graphite-based conductive material, a carbon black-based conductive material, and a metal-based or metal compound-based conductive material. Examples of the graphite-based conductive material include artificial graphite, natural graphite, etc., examples of the carbon black-based conductive material include acetylene black, ketjen black, denka black, thermal black, channel black, etc., and examples of the metal-based or metal compound-based conductive material include perovskite materials such as tin, tin oxide, tin phosphate ($SnPO_4$), titanium oxide, potassium titanate, $LaSrCoO_3$, and $LaSrMnO_3$, etc. But it is not limited to the above-listed conductive materials.

The content of the conductive material is preferably 0.1 to 10 parts by weight based on 100 parts by weight of the whole electrode active material. If the content of the conductive material is less than 0.1 parts by weight, electrochemical properties may be deteriorated, and if it exceeds 10 parts by weight, energy density per weight may be decreased.

The thickener is not particularly limited so long as it can play a role of controlling the viscosity of the active material slurry, but for example, carboxymethyl cellulose, hydroxymethyl cellulose, hydroxyethyl cellulose, hydroxypropyl cellulose, etc. may be used.

The cathode and anode active material slurries prepared as described above are applied to electrode current collectors to prepare the cathode and anode. In this case, aluminum or an aluminum alloy may be used as the cathode current collector, and copper or a copper alloy may be used as the anode current collector. Types of the cathode current collector and the anode current collector may include a foil, film, sheet, punched member, porous body, foam and the like.

The prepared cathode and anode are manufactured as an electrode structure with a separator interposed therebetween, and then housed in a battery case, followed by injecting an electrolyte therein to manufacture a lithium secondary battery. As the separator, conventional porous polymer films commonly used as separators, for example, polyolefin polymers such as ethylene homopolymer, propylene homopolymer, ethylene/butene copolymer, ethylene/hexene copolymer, and ethylene/methacrylate copolymer may be used alone or by laminating these substances. Alternately, conventional porous nonwoven fabrics, for example, a nonwoven fabric made of glass fiber having a high melting point, polyethylene terephthalate fiber, or the like may be used, but it is not limited thereto.

An external shape of the lithium secondary battery of the present invention is not particularly limited, but may be manufactured in a cylindrical shape using a can, a square shape, a pouch shape or a coin shape.

Since the lithium secondary battery according to the present invention includes the electrolyte for a lithium secondary battery including the compound represented by Formula 1, there are advantages in that high output characteristics may be exhibited, and sufficient performance may be demonstrated even after being stored at a high temperature, as well as it is possible to suppress an increase in the thickness of the battery by suppressing a generation of volatile substances.

Hereinafter, examples will be described to more concretely understand the present invention. However, it will be apparent to those skilled in the art that various modifications and alterations of such examples may be possible as defined by the appended claims, and the scope of the present invention is duly not limited to the following examples. Such examples are provided for completely describing the present invention to persons having ordinary knowledge and skills in the related art. In addition, "%" and "part" indicating the content below are based on weight unless the context specifically indicates otherwise.

Synthesis Example 1

1 equivalent of lithium hexafluorophosphate ($LiPF_6$) was dissolved in a dimethyl carbonate solvent, and then 2 equivalents of dimethylbis(trimethylsilyl)hyperdiphosphate were slowly added dropwise, followed by performing a reaction under a condition of 45° C. for 24 hours. After the reaction is completed, the solvent was removed with a distillation apparatus and residual volatile substances were removed through vacuum drying to synthesize a compound represented by Formula 2.

[Formula 2]

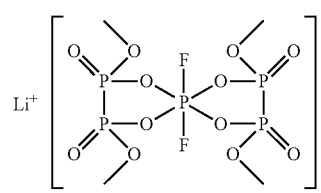

The synthesized compound exhibited ¹H NMR DMSO δ3.8 ppm, P-NMR DMSO δ-20.4 ppm, δ-145.7 ppm, F-NMR DMSO δ71 ppm, and ICP-MS Li:P ratio of 1:4.8 (calculated value 1:5).

Synthesis Example 2

1 equivalent of lithium hexafluorophosphate (LiPF$_6$) was dissolved in a dimethyl carbonate solvent, and then 2 equivalents of bis(tetramethylsilyl)pyrophosphate were slowly added dropwise, followed by performing a reaction under a condition of 45° C. for 24 hours. After the reaction is completed, the solvent was removed with a distillation apparatus and residual volatile substances were removed through vacuum drying to synthesize a compound represented by Formula 3.

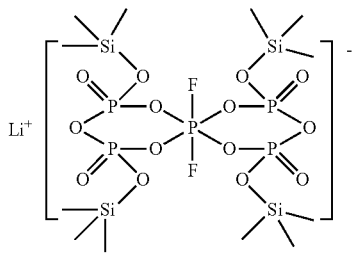

[Formula 3]

The synthesized compound exhibited ¹H NMR Acetone δ0.8 ppm, P-NMR Acetone δ-30.4 ppm, δ-144.3 ppm, F-NMR Acetone δ72 ppm, and ICP-MS Li:P:Si ratio of 1:4.7:4.6 (calculated value 1:5:5).

Synthesis Example 3

1 equivalent of lithium hexafluorophosphate (LiPF$_6$) was dissolved in a dimethyl carbonate solvent, and then 2 equivalents of difluoro(trimethylsilyl)pyrophosphate were slowly added dropwise, followed by performing a reaction under a condition of 45° C. for 24 hours. After the reaction is completed, the solvent was removed with a distillation apparatus and residual volatile substances were removed through vacuum drying to synthesize a compound represented by Formula 4.

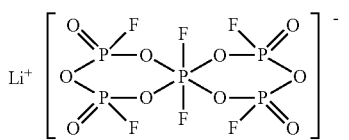

[Formula 4]

The synthesized compound exhibited P-NMR DMSO δ-35.5 ppm, δ-14.7 ppm, F-NMR DMSO δ-71 ppm, and ICP-MS Li:P ratio of 1:4.6 (calculated value 1:5).

Synthesis Example 4

1 equivalent of lithium hexafluorophosphate (LiPF$_6$) was dissolved in a dimethyl carbonate solvent, and then 2 equivalents of trimethylsilylethoxytrimethylsilyloxyphosphine formate were slowly added dropwise, followed by performing a reaction under a condition of 45° C. for 24 hours. After the reaction is completed, the solvent was removed with a distillation apparatus and residual volatile substances were removed through vacuum drying to synthesize a compound represented by Formula 5.

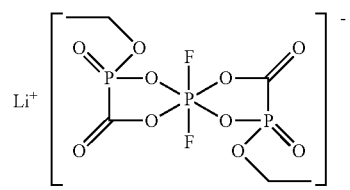

[Formula 5]

The synthesized compound exhibited ¹H NMR DMSO δ3.1 δ1.4 ppm, P-NMR DMSO δ-30.1 ppm, δ-149.2 ppm, F-NMR DMSO δ-72 ppm, and ICP-MS Li:P ratio of 1:1.9 (calculated value 1:2).

Synthesis Example 5

1 equivalent of lithium tetrafluoroborate (LiBF4) was dissolved in a dimethyl carbonate solvent, and then 2 equivalents of dimethylbis(trimethylsilyl)hyperdiphosphate were slowly added dropwise, followed by performing a reaction under a condition of 45° C. for 24 hours. After the reaction is completed, the solvent was removed with a distillation apparatus and residual volatile substances were removed through vacuum drying to synthesize a compound represented by Formula 6.

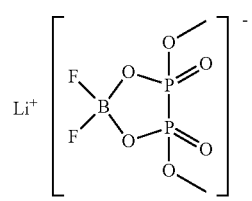

[Formula 6]

The synthesized compound exhibited ¹H NMR DMSO δ1.8 ppm, P-NMR DMSO δ-28.8 ppm, B-NMR DMSO δ 2.8 ppm, F-NMR DMSO δ-61 ppm, and ICP-MS Li:P:B ratio of 1:1.8:0.92 (calculated value 1:2:1).

Synthesis Example 6

1 equivalent of lithium hexafluorophosphate (LiPF$_6$) was dissolved in a dimethyl carbonate solvent, and then 2 equivalents of hydroxymethanesulfonic acid were added, followed by decreasing the temperature to 0° C. Then, 3 equivalents of tetrachlorosilane were slowly added dropwise, and a reaction was performed under a condition of 45° C. for 24 hours. After the reaction is completed, the solvent was removed by a distillation apparatus and residual volatile substances were removed through vacuum drying to synthesize a compound represented by Formula 7.

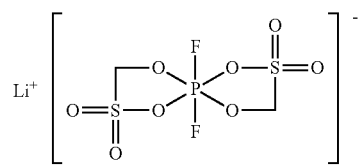

[Formula 7]

The synthesized compound exhibited $^1$H NMR DMSO δ2.2 ppm, P-NMR DMSO δ-149.6 ppm, F-NMR DMSO δ-74 ppm, and ICP-MS Li:P:S ratio of 1:0.98:2.96 (calculated 1:1:2).

Synthesis Example 7

1 equivalent of lithium hexafluorophosphate (LiPF$_6$) was dissolved in a dimethyl carbonate solvent, and then 2 equivalents of dimethyl diphosphoric acid were added, followed by decreasing the temperature to 0° C. 3 equivalents of tetrachlorosilane were slowly added dropwise, and a reaction was performed under a condition of 45° C. for 24 hours. After the reaction is completed, the solvent was removed by a distillation apparatus and residual volatile substances were removed through vacuum drying to synthesize a compound represented by Formula 8.

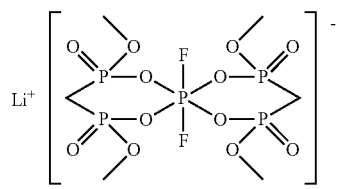

[Formula 8]

The synthesized compound exhibited $^1$H NMR DMSO δ2.8 ppm, P-NMR DMSO δ-28.2 ppm, δ-148.8 ppm, F-NMR DMSO δ-72 ppm, and ICP-MS Li:P ratio of 1:4.7 (calculated value 1:5).

Synthesis Example 8

1 equivalent of lithium hexafluorophosphate (LiPF$_6$) was dissolved in a dimethyl carbonate solvent, and then 2 equivalents of bis(trimethylsilyl)methanedisulfonate were slowly added dropwise, followed by performing a reaction under a condition of 45° C. for 24 hours. After the reaction is completed, the solvent was removed with a distillation apparatus and residual volatile substances were removed through vacuum drying to synthesize a compound represented by Formula 9.

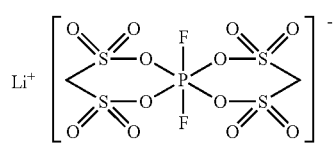

[Formula 9]

The synthesized compound exhibited $^1$H NMR DMSO δ5.3 ppm, P-NMR DMSO δ-33.4 ppm, δ-150.2 ppm, F-NMR DMSO δ-60 ppm, and ICP-MS Li:P:S ratio of 1:0.9:3.9 (calculated value 1:1:4).

Synthesis Example 9

1 equivalent of boron trifluoride (BF3) was dissolved in a dimethyl carbonate solvent, 1 equivalent of lithium methylene disulfonate was slowly added dropwise, followed by performing a reaction under a condition of 45° C. for 24 hours. The solid was recovered by filtration under reduced pressure, washed with 20 g of ethyl methyl carbonate (EMC), and further dried under reduced pressure at 40° C. for 3 hours. After the reaction is completed, the solvent was removed with a distillation apparatus and residual volatile substances were removed through vacuum drying to synthesize a compound represented by Formula 10.

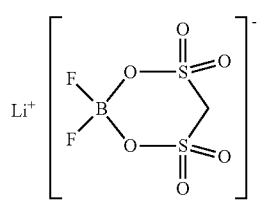

[Formula 10]

The synthesized compound exhibited $^1$H NMR DMSO δ 0.8 ppm, B-NMR DMSO δ 1.6 ppm, F-NMR DMSO δ-62 ppm, and ICP-MS Li:B:S ratio of 1:0.9:1.9 (calculated 1:1:2).

Synthesis Example 10

1 equivalent of lithium hexafluorophosphate (LiPF$_6$) was dissolved in a dimethyl carbonate solvent, and then 2 equivalents of bis(trimethylsilyl)difluorodiphosphate were slowly added dropwise, followed by performing a reaction under a condition of 45° C. for 24 hours. After the reaction is completed, the solvent was removed with a distillation apparatus and residual volatile substances were removed through vacuum drying to synthesize a compound represented by Formula 11.

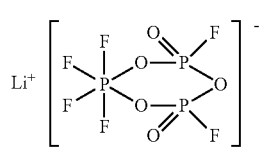

[Formula 11]

The synthesized compound exhibited P-NMR DMSO δ-33.4 ppm, δ-149.2 ppm, F-NMR DMSO δ-72 ppm, and ICP-MS Li:P:Si ratio of 1:2.8 (calculated value 1:3).

Synthesis Example 11

1 equivalent of lithium tetrafluoroborate (LiBF$_4$) was dissolved in a dimethyl carbonate solvent, and then 2 equivalents of tetrakis(trimethylsilyl) diphosphate were slowly added dropwise, followed by performing a reaction under a condition of 45° C. for 24 hours. After the reaction is completed, the solvent was removed with a distillation apparatus and residual volatile substances were removed through vacuum drying to synthesize a compound represented by Formula 12.

[Formula 12]

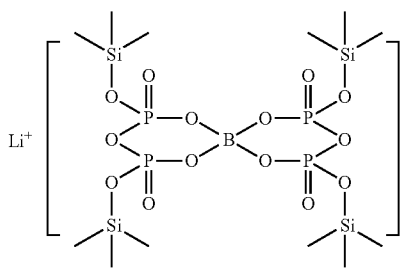

The synthesized compound exhibited $^1$H NMR DMSO δ0.8 ppm, P-NMR DMSO δ-25.6 ppm ppm, B-NMR DMSO δ2.7 ppm, and ICP-MS Li:B:P:Si ratio of 1:0.9:3.8:3.6 (calculated value 1:1:4:4).

Synthesis Example 12

1 equivalent of lithium tetrafluoroborate (LiBF4) was dissolved in a dimethyl carbonate solvent, and then 2 equivalents of bis(trimethylsilyl)difluorodiphosphate were slowly added dropwise, followed by performing a reaction under a condition of 45° C. for 24 hours. After the reaction is completed, the solvent was removed with a distillation apparatus and residual volatile substances were removed through vacuum drying to synthesize a compound represented by Formula 13.

[Formula 13]

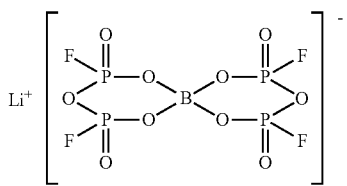

The synthesized compound exhibited P-NMR DMSO δ-33.4 ppm, F-NMR DMSO δ-72 ppm, B-NMR DMSO δ3.2 ppm, and ICP-MS Li:B:P ratio of 1:0.96:3.8 (calculated 1:1:4).

Example 1

(1) Preparation of Cathode and Anode 97.3 parts by weight of LiCoO$_2$ as a cathode active material, 1.4 parts by weight of polyvinylidene fluoride as a binder, and 1.3 parts by weight of Ketjen black as a conductive material were mixed, and then dispersed in N-methylpyrrolidone to prepare a cathode active material slurry. The prepared cathode active material slurry was applied to an aluminum foil, dried, and then rolled to prepare a cathode.

In addition, 98 parts by weight of graphite, as an anode active material, 1 part by weight of polyvinylidene fluoride as a binder, and 1 part by weight of Ketjen black as a conductive material were mixed, and then dispersed in N-methylpyrrolidone to prepare an anode active material layer composition. The prepared anode active material layer composition was applied to a copper foil, dried, and then rolled to prepare an anode.

(2) Preparation of Electrolyte for Lithium Secondary Battery

A non-aqueous mixed solution was prepared by adding 0.95M of LiPF$_6$ to a mixed solution having a volume ratio of ethylene carbonate (EC):diethyl carbonate (DEC):ethylpropionate (EP) of 40:40:20.

3.0 parts by weight of a compound represented by Formula 2 below, based on 100 parts by weight of the total non-aqueous mixed solution, was added thereto to prepare an electrolyte for a lithium secondary battery.

[Formula 2]

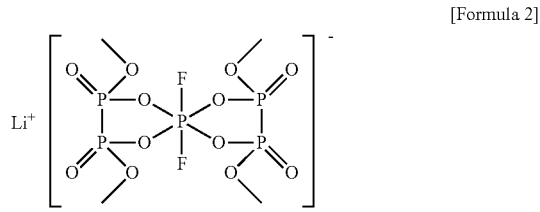

(3) Manufacture of Lithium Secondary Battery

A lithium secondary battery was manufactured using the cathode and the anode prepared according to the above (1), and the electrolyte prepared according to the above (2).

Examples 2 to 12

Lithium secondary batteries were manufactured according to the same procedures as described in Example 1, except that the compounds represented by Formulae 3 to 13 below were added instead of the compound represented by Formula 2, respectively.

[Formula 3]

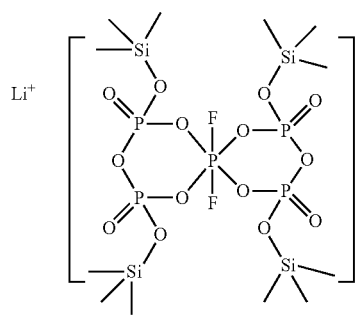

[Formula 4]

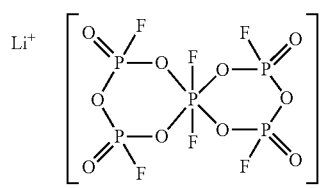

[Formula 5]

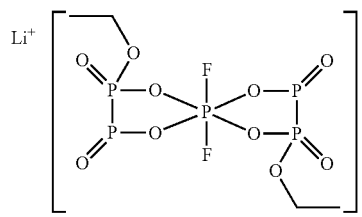

-continued

[Formula 6]

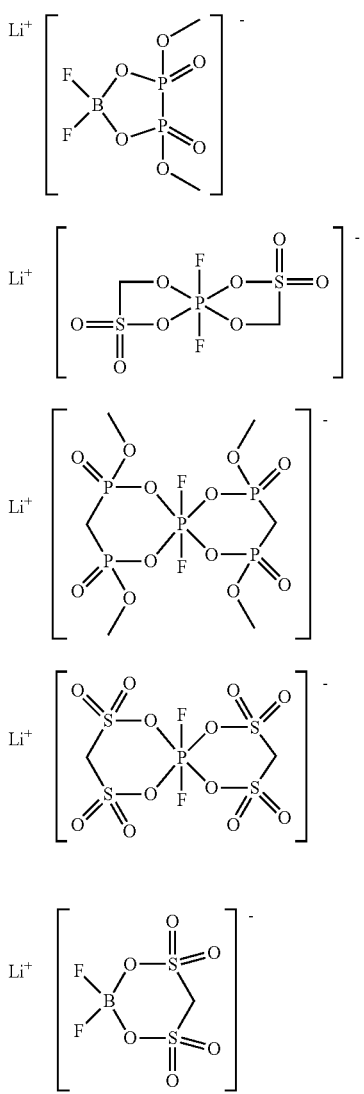

[Formula 7]

[Formula 8]

[Formula 9]

[Formula 10]

[Formula 11]

[Formula 12]

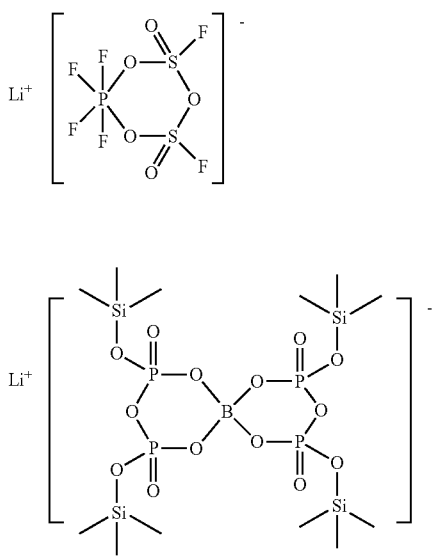

[Formula 13]

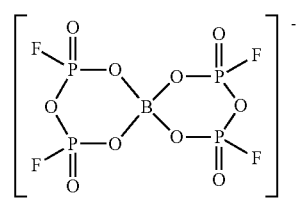

Comparative Example 1

(1) Preparation of Cathode and Anode

A cathode and an anode were prepared according to the same procedures as described in Example 1.

(2) Preparation of Electrolyte

A non-aqueous mixed solution was prepared by adding 0.95M of $LiPF_6$ to a mixed solution having a volume ratio of ethylene carbonate (EC):diethyl carbonate (DEC):ethyl-propionate (EP) of 40:40:20.

(3) Manufacture of Lithium Secondary Battery

A lithium secondary battery was manufactured using the cathode and the anode prepared according to the above (1), and the electrolyte prepared according to the above (2).

Comparative Example 2

A lithium secondary battery was manufactured according to the same procedures as described in Example 1, except that lithium trioxalyl phosphate was used instead of the compound represented by Formula 2.

Comparative Example 3

A lithium secondary battery was manufactured according to the same procedures as described in Example 1, except that bis(oxalyl)difluorophosphate lithium salt (LiFOB(LiB $(C_2O_4)_2$)) was used instead of the compound represented by Formula 2.

Experimental Example

The secondary batteries prepared according to the examples and comparative examples were charged with a constant current at 25° C. at a current density of 0.2 C until the voltage reached 4.2 V, and then discharged with the constant current at a current density of 0.2 C until the voltage reached 2.5 V. Then, the secondary batteries were charged with a constant current at a current density of 0.5 C until the voltage reached 4.2V, and then charged at a constant voltage while maintaining 4.2V until the current density reached 0.05 C. Then, the secondary batteries were discharged with the constant current at a current density of 0.5 C until the voltage reached 2.5 V at the time of discharging (a formation step).

(1) Life-Span Characteristics at Room Temperature

The secondary batteries that had undergone the formation step were charged with a constant current at 25° C. at a current density of 1.0 C until the voltage reached 4.2 V, and were charged with a constant voltage until the current density reached 0.05 C while maintaining 4.2 V. Then, a cycle of discharging at a constant current of 1.0 C until the voltage reached 2.5 V during discharging was repeated 300 times.

A capacity retention ratio (%) at 300th cycle of each secondary battery was calculated by Equation 1 below, and results thereof are shown in Table 1 below.

Capacity retention ratio [%]=[Discharge capacity at 300th cycle/Discharge capacity at 1st cycle]×100  [Equation 1]

(2) High Temperature Stability

The secondary batteries that had undergone the formation step were charged with a constant current at 25° C. at a current density of 1.0 C until the voltage reached 4.2 V, and were charged with a constant voltage until the current density reached 0.05 C while maintaining 4.2 V. Then, while the charged secondary batteries were stored at 60° C., the voltages were measured every 24 hours using a multi-meter to measure residual voltages at a high temperature of the charged-state cell to determine high-temperature voltage storage stabilities.

A voltage retention ratio (%) of each secondary battery measured on day 15 was calculated by Equation 2 below, and results thereof are shown in Table 1 below.

Voltage retention ratio [%]=[Open-circuit voltage on day 15/Initial open-circuit voltage]×100  [Equation 2]

(3) Thickness Increase Rate

The lithium secondary batteries prepared according to the examples and comparative examples were charged with a constant current at a current density of 1 C until the voltage reached 4.45 V. After charging, thicknesses were measured, and thickness change rates (%) were measured while storing them at 60° C. for 28 days. The thickness change rate at the time of measurement on day 28 of each secondary battery was calculated by Equation 3 below, and results thereof are shown in Table 1 below.

Thickness increase rate[%]=[Thickness of secondary battery on day 28/Initial thickness of secondary battery]×100  [Equation 3]

(4) Internal Resistance Increase Rate

Internal resistances of lithium secondary batteries prepared according to the examples and comparative examples were measured. The internal resistance measurement was performed by adjusting to 50% of battery capacity (SOC=50%), then allowing 0.5 A, 1 A, 2 A, 3 A, and 5 A currents to flow, and battery voltages after 10 seconds were measured. The measured currents and voltages were approximated by a straight line, and the internal resistances were obtained from a slope. Resistance increase rates, which represent a rate at which the internal resistance is increased in repeated charging and discharging in the same manner as described above, were evaluated.

The resistance increase rate was calculated using Equation 4 below, by setting an internal resistance of 1st cycle to be initial internal resistance R1 (Ω) and an internal resistance at 300th cycle to be internal resistance R300 (Ω) after the cycle in a charge/discharge cycle test, and results thereof are shown in Table 1 below.

Resistance increase rate $R_{ma}$(%)=(R300−R1)/R1×100  [Equation 4]

TABLE 1

| | Capacity retention ratio (%) | Voltage retention ratio (%) | Thickness increase rate (%) | Resistance increase rate (%) |
|---|---|---|---|---|
| Example 1 | 88.1 | 82.4 | 5.4 | 51 |
| Example 2 | 90.6 | 83.2 | 12.2 | 47 |
| Example 3 | 93.1 | 88.7 | 3.8 | 42 |
| Example 4 | 92.5 | 85.4 | 4.2 | 58 |
| Example 5 | 89.8 | 84.3 | 8.0 | 55 |
| Example 6 | 92.5 | 85.4 | 6.2 | 52 |
| Example 7 | 91.3 | 86.5 | 4.6 | 55 |
| Example 8 | 90.7 | 85.6 | 5.2 | 48 |
| Example 9 | 91.9 | 85.8 | 6.8 | 46 |
| Example 10 | 92.2 | 87.1 | 3.9 | 42 |
| Example 11 | 92.3 | 86.4 | 4.1 | 41 |
| Example 12 | 91.1 | 84.3 | 8.1 | 53 |
| Example 13 | 92.4 | 85.1 | 3.7 | 39 |
| Comparative Example 1 | 76.3 | 70.3 | 29.6 | 279 |
| Comparative Example 2 | 86.3 | 83.6 | 23.2 | 72 |
| Comparative Example 3 | 86.3 | 78.6 | 27.2 | 68 |

Referring to Table 1, it can be seen that in the examples in which the electrolyte for a lithium secondary battery including the compound according to the present invention is injected as an additive, the thickness increase rate and the resistance increase rate are small while having excellent life-span characteristics at room temperature and high temperature stability.

What is claimed is:

1. A compound represented by Formula 1 below:

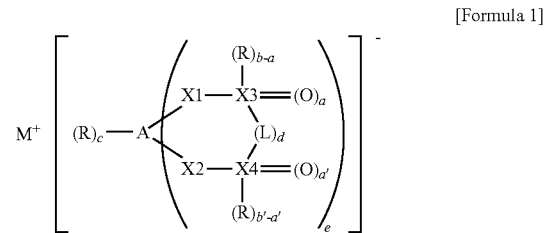

[Formula 1]

wherein X1 and X2 are each independently —O—, —S— or —NR'—;

R' is a linear, branched or cyclic C1 to C10 hydrocarbon group which may contain a hetero atom or halogen atom;

X3 and X4 are each independently carbon, phosphorus or sulfur with a proviso that at least one of X3 and X4 is phosphorus or sulfur;

A is boron or phosphorus;

R is each independently hydrogen; a halogen atom; a linear, branched or cyclic C1 to C10 hydrocarbon group which may contain a halogen atom; OR'; or OSiR'$_3$;

L is a C1 hydrocarbon group unsubstituted or substituted by a halogen atom; or oxygen;

M is lithium, sodium, potassium or ammonium (NR"$_4$);

R" is each independently hydrogen; or a linear, branched or cyclic C1 to C10 hydrocarbon group which may contain a hetero atom or halogen atom;

a and a' are each independently an integer of 0 to 2;

b and b' are each independently an integer of 0 to 2 with a proviso that b-a and b'-a' are an integer of 0 or more;

c is an integer of 0 to 4;

d is an integer of 0 to 3; and e is an integer of 1 to 3.

2. The compound according to claim 1, wherein the compound represented by Formula 1 is further defined as follows:

in Formula 1, when X3 or X4 is carbon, a is 0 or 1, a' is 0 or 1, b is 1 or 2, and b' is 1 or 2;
when X3 or X4 is phosphorus, a is 0 or 1, a' is 0 or 1, b is 1 or 2, and b' is 1 or 2;
when X3 or X4 is sulfur, a is an integer of 0 to 2, a' is an integer of 0 to 2, b is an integer of 0 to 2, and b' is an integer of 0 to 2;
when A is boron, c is 0 or 2;
when A is phosphorous, c is 0, 2 or 4;
when L is carbon, d is an integer of 0 to 3; and
when L is oxygen, d is 0 or 1.

3. The compound according to claim 2, wherein the compound represented by Formula 1 is represented by any one of Formula 2 to 13 below:

[Formula 2]

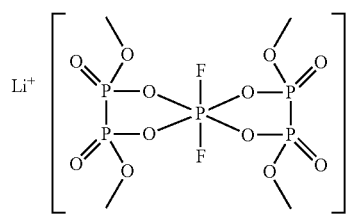

[Formula 3]

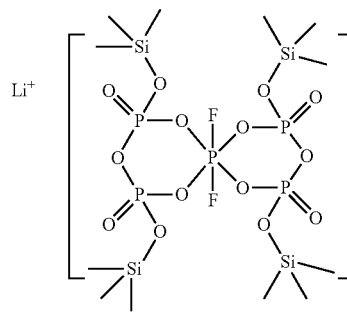

[Formula 4]

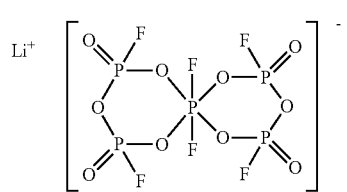

[Formula 5]

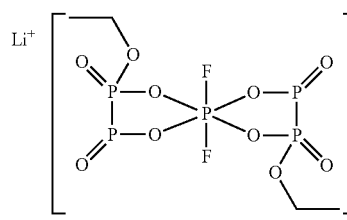

[Formula 6]

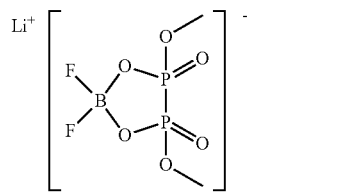

[Formula 7]

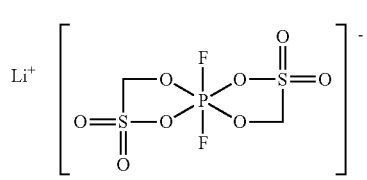

[Formula 8]

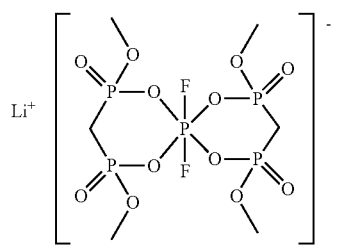

[Formula 9]

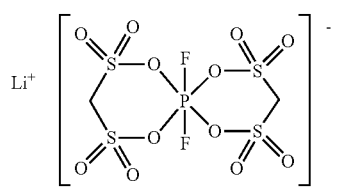

[Formula 10]

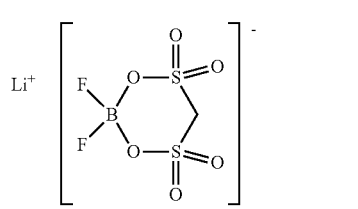

[Formula 11]

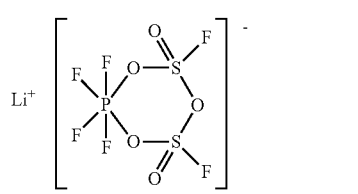

[Formula 12]

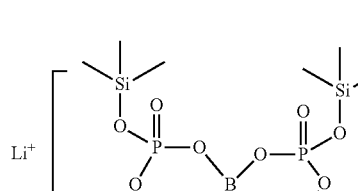

[Formula 13]

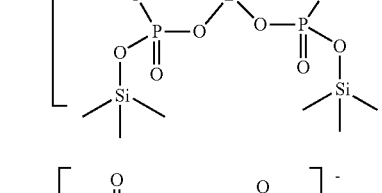

4. An electrolyte for a lithium secondary battery comprising the compound according to claim 1.

5. The electrolyte for a lithium secondary battery according to claim 4, wherein the compound is included in an amount of 0.01 to 10 parts by weight based on 100 parts by weight of a whole electrolyte for a lithium secondary battery.

6. The electrolyte for a lithium secondary battery according to claim 5, wherein the compound is included in an amount of 0.1 to 5.0 parts by weight based on 100 parts by weight of the whole electrolyte for a lithium secondary battery.

7. The electrolyte for a lithium secondary battery according to claim 4, further comprising at least one selected from the group consisting of a lithium salt; and an organic solvent.

8. A lithium secondary battery comprising the electrolyte for a lithium secondary battery according to claim 4.

\* \* \* \* \*